United States Patent [19]

Cureton et al.

[11] Patent Number: 4,688,439
[45] Date of Patent: Aug. 25, 1987

[54] WABBLE PLATE ENGINE MECHANSIM

[75] Inventors: George K. Cureton, Croydon; Joseph Scalzo, Kew; Gary J. White, Mentone, all of Australia

[73] Assignee: S. V. Engine Co. Pty. Ltd., Kew, Australia

[21] Appl. No.: 723,731

[22] Filed: Apr. 16, 1985

[30] Foreign Application Priority Data

Apr. 17, 1984 [AU] Australia .............................. PG 4612
Oct. 22, 1984 [AU] Australia .............................. PG 7763

[51] Int. Cl.⁴ ............................................. F16H 23/02
[52] U.S. Cl. ...................................................... 74/60
[58] Field of Search ............................................. 74/60

[56]  References Cited

U.S. PATENT DOCUMENTS

| 2,341,203 | 2/1944 | Borer | 74/60 |
| 2,827,792 | 3/1958 | Hopkins | 74/60 |
| 4,433,596 | 2/1984 | Scalzo | 74/60 |

FOREIGN PATENT DOCUMENTS 6827481  9/1981  Australia .

*Primary Examiner*—Lawrence Staab
*Attorney, Agent, or Firm*—Merchant, Gould, Smith, Edell, Welter & Schmidt

[57] ABSTRACT

The wobble plate engine mechanism includes a cylinder block and mainshaft; a drive hub obliquely mounted for rotation with the mainshaft; a wobble plate rotatable around the hub; cylinders spaced around the mainshaft; and a piston moveable in each cylinder and couple to arms of the wobble plate. Piston and arm couplings comprises a cross-head reciprocable in a piston bore and a gudgeon pin moveable end-wise in a cross-head bore; the cross-head bore and ends of the pin defining cavities so lubricant access, under some operating conditions, dampens that end-wise movement. Means for shifting the wobble plate axis along the mainshaft includes a drawing member coupled to the mainshaft and rotatable on the block to draw the mainshaft, a rotatable actuator shaft and a drive train between the drawing member and actuator shaft. Means for varying the drive hub angle is pivotally connected to the hub and mainshaft on respective sides of the mainshaft. Also, diagonally opposed weights on respective sides of the hub are balanced and offset so their centrifugal force is neutralized, to produce a couple opposite to an out of balance couple from piston and wobble plate motion.

10 Claims, 6 Drawing Figures

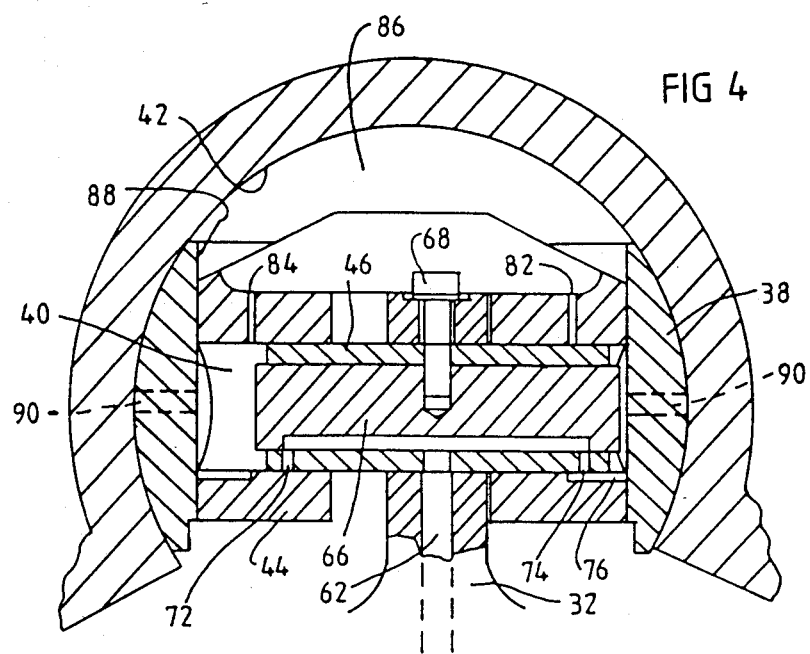

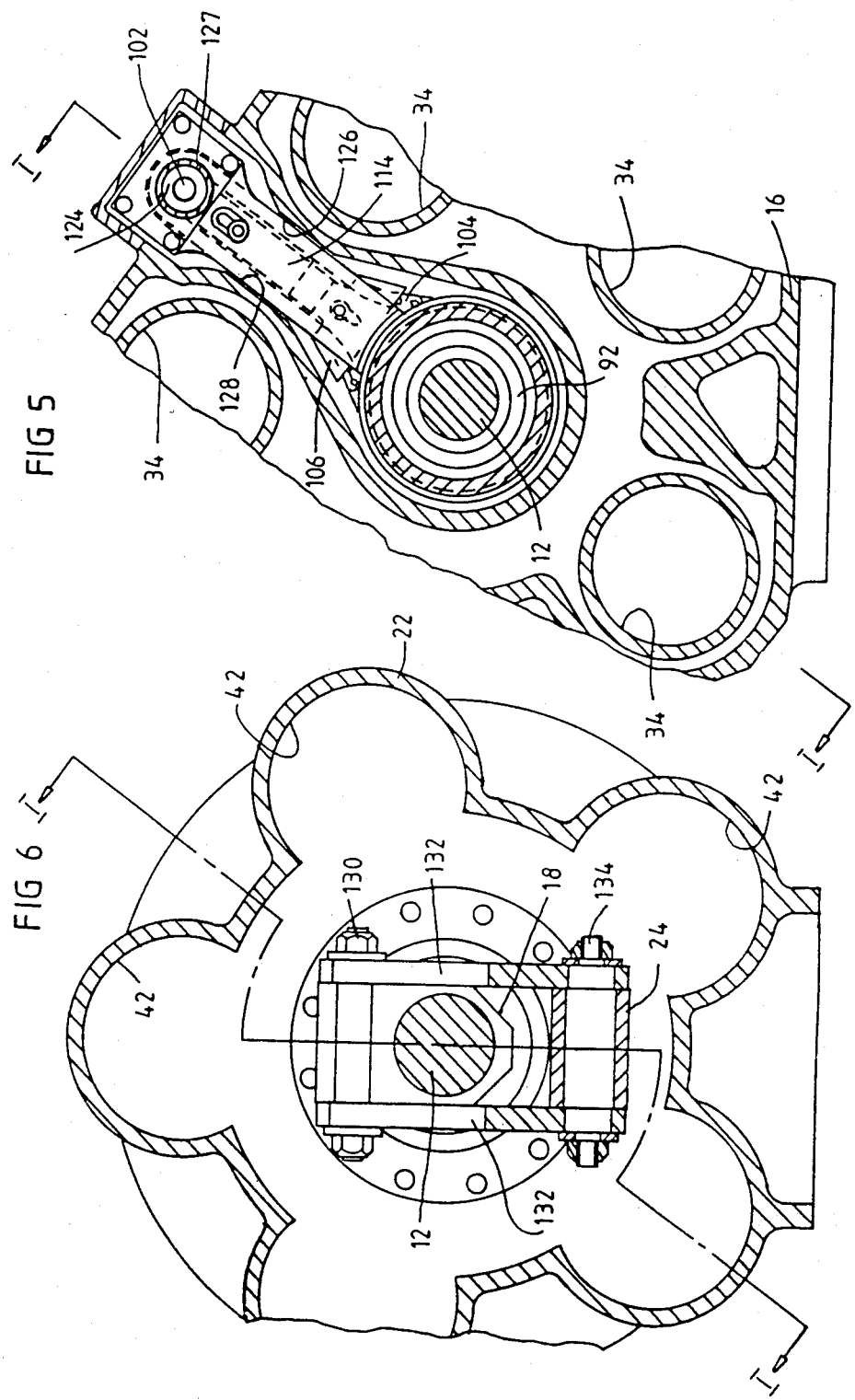

WABBLE PLATE ENGINE MECHANSIM

This invention relates to wabble plate mechanisms of fixed displacement and variable displacement types, and is applicable to internal and external combustion engines and pumps.

Wabble plate engine mechanisms broadly comprise a plurality of piston/cylinders arranged around the axis of a mainshaft, and each coupled to a respective arm of a wabbler plate which is rotatably mounted on a wabble carrier obliquely mounted on the mainshaft. As the mainshaft rotates, each piston is forced to reciprocate in its cylinder, and vice versa. These mechanisms are known for example from U.S. Pat. No. 2,258,157 to Almen.

In Australian applications No. 68274/81, there is described a variable displacement wabble plate engine mechanism in which displacement is infinitely variable between predetermined upper and lower limits, while maintaining substantially constant compression ratio. In that application a system for stabilising the oscillating motion of the wabble plate is described.

The present invention is directed to providing an improved wabble plate engine mechanism of the above-mentioned type. In one form, the invention provides an improved arrangement for a damping system of stabilization. Another form provides an improved balancing arrangement. In a further form, the invention provides an improved linkage arrangement enabling variation in the tilt of the wabble plate. In a still further form, the invention provides improved overall constructional features.

Each such improved form may be incorporated in a wabble plate engine mechanism separately from the others. However, the mechanism may include two or more of such forms.

In each form, the improved wabble plate engine mechanism of the invention includes a cylinder block having a mainshaft rotatable therein; a drive hub obliquely mounted on the mainshaft for rotation therewith; a wabble plate rotatably mounted on the drive hub; and a plurality of cylinders arranged around the mainshaft, each with a piston reciprocally movable therein along a respective axis substantially parallel to the rotational axis of the mainshaft, each piston being coupled to a respective arm of the wabble plate.

In a wabble plate mechanism according to one form of the invention, the coupling between at least one piston and its arm of the wabble plate comprises a cross-head reciprocable in a bore of an extension of the piston, which bore extends radially with respect to the mainshaft axis, and a gudgeon pin on the arm reciprocably movable end-wise in a bore of the cross-head; the cross-head bore defining, with each end of the gudgeon pin a respective cavity; the coupling being adapted to enable lubricant liquid supplied thereto access alternately to each cavity under some operating conditions for the mechanism to dampen the extent and/or rate of movement of the gudgeon pin.

As will be appreciated, as the mainshaft and drive hub rotate, each arm of the wabble plate traverses a lemniscate path (a figure of eight on the surface of the sphere). This movement is accommodated in the coupling by the radial freedom afforded by the cross-head in the piston extension bore and the tangential freedom afforded by end-wise movement of the gudgeon pin, with its arm, in the cross-head bore. The amplitude of the end-wise movement of the gudgeon pin is a function of the piston displacement. Under normal operating conditions, the amplitude is substantially constant for a given displacement but, due to frictional torque generated by bearing surfaces, the amplitude can increase under some operating conditions such as when the mechanism is not under load. The enabled access of lubricant to the cavities defined by the cross-head bore enables such torque to be absorbed or offset so as to restrain such resultant increase in amplitude.

The engine mechanism preferably has each of its pistons coupled to a respective arm of the wabble plate by a respective such coupling.

In one arrangement, the lubricant passes to a location in the coupling intermediate of the ends of the gudgeon pin. From that location, the lubricant can flow toward a respective outlet adjacent to each end of the gudgeon pin, with each outlet preferably being closed during movement of the gudgeon pin through an amplitude or a range of amplitudes of its movement corresponding to normal operation of the engine mechanism, and being opened to communication with a respective cavity at greater amplitudes.

The gudgeon pin may define interiorly thereof a longitudinal passage connecting each outlet with a lubricant inlet. The gudgeon pin may be a cylindrical sleeve closed at each end, with the bore of the sleeve defining the passage. Alternatively, the gudgeon pin may be a cylindrical sleeve having an insert rod therein, with the passage being defined in the bore of the sleeve and/or in the opposed surface of the rod.

The outlets of the gudgeon pin preferably open radially thereof. Each outlet preferably is closed by a surface defining the bore of the cross-head. A portion of such bore surface may be recessed at each of respective end portions thereof, each recess providing communication between a respective outlet and cavity during movement of the gudgeon pin means of greater amplitude than for normal operation. Preferably such recess has a width, circumferentially of the cross-head bore, which is substantially larger than the corresponding width of the outlet so that such communication is achieved despite limited rotation of the gudgeon pin in the cross-head bore simultaneously with its end-wise movement.

The cross-head bore may be open ended and, in such case, each cavity defined by that bore is bounded by the piston extension bore. In this arrangement, a respective passage can be provided between an external bearing surface of the extension and each cavity to allow the egress of lubricant from the cavities to such surfaces, under a pumping action provided by the gudgeon pin at least during its movement through greater amplitudes.

During end-wise movement of the gudgeon pin toward one cavity, fluid pressure in the latter is increased by that movement, with a corresponding reduction of pressure in the other cavity. If the amplidute of the movement is sufficient, fluid pressure in that one cavity is further increased by the resultant flow of lubricant allowed. Each cavity may have a vent hole by which it is in communication with atmosphere, so that the tendency for reduction of pressure in the other cavity does not cause hydraulic locking of the gudgeon pin. The vent hole of the one cavity preferably is closed before the outlet to communicate with that cavity is opened, so that again hydraulic locking is avoided. As a consequence, each cavity at all times has a quantity of lubricant and air therein; the compressibility of the air reducing the severity of damping of end-wise movement of the gudgeon pin and, with inflow of lubricant to the cavity, providing smoothly increasing dampening without hydraulic hammer or lock.

The supply of liquid lubricant to the coupling may pass to the latter from the mainshaft, through the drive hub, and radially through the wabble plate. Flow-ways for such supply also can provide lubricant for bearings between the drive hub and the wabble plate.

As in application No. 68274/81, the means for shifting the wabble plate may include a drawing member rotatably mounted on the cylinder block and coupled to the mainshaft so that its rotation draws the mainshaft axially. However, in the present invention, the shifting means further includes an actuator shaft rotatable on an axis parallel to but spaced laterally of the mainshaft, and a drive train coupled between the actuator shaft and the drawing member.

In one preferred form of the shifting means, the drawing member is a screw member axially fixed relative to the mainshaft but co-axially rotatable relative thereto such, that on rotation of the screw member, it draws the mainshaft along its axis. The drive train preferably is a chain passing around sprockets on the actuator shaft and the screw member.

Most conveniently, the actuator shaft is axially fixed relative to a follower member in which it is rotatable. The follower member may be coupled to the drawing member or the mainshaft so that the follower member and actuator shaft move parallel to the axis of the mainshaft as the latter is drawn by the drawing member. Such coupling preferably is by means of an annular groove on the drawing member or mainshaft engaging a radially extending flange on the follower member, or by a converse arrangement of an annular flange on the drawing member or mainshaft and a groove on the follower member.

The follower member may have an arm portion extending radially from the actuator shaft and terminating at its coupling with the drawing member or mainshaft, and an elongate tubular portion in which the actuator shaft is rotatable. In one form, the arm portion of the follower member is guided for linear movement parallel to the axis of the mainshaft by at least one surface, but preferably between parallel surfaces, of the cylinder block (or engine case).

As in application No. 68274/81, provision is made for altering the drive hub angle as a consequence of operation of the above shifting means or, if required, independently of movement of the axis of the drive hub along the axis of the mainshaft. Such provision is by means of a flexible linkage between the drive hub and a connection fixed relative to the cylinder block (or engine case associated therewith). The flexible linkage most conveniently is by link means pivotally connected at one end to the drive hub and at its other end to an anchor member. However, in order to minimise non-linear variation of compression ratio between predetermined limits at maximum and minimum engine displacement, these pivotal connections are located on opposite sides of the mainshaft axis and mutually spaced to the maximum practical extent. The link means most conveniently comprises a parallel pair of links between which the mainshaft extends.

A desired objective of the variable displacement (stroke) internal combustion engine is to maintain a substantially constant compression ratio between the predetermined limits of minimum and maximum displacement. In certain applications it is desirable to obtain a changing compression ratio, either increasing with increasing displacement, or decreasing with increasing displacement or a combination of the two. In the first and second case, it is desirable for control purposes to achieve a substantially linear change in compression ratio. The above-described flexible linkage provides a substantial improvement in structural integrity and ease of manufacture, and increases the length of the link means, increasing the radius of curvature at the arc through which the pivotal connection at the drive hub moves, and therefore improving the linearity of the compression ratio between minimum and maximum displacement positions.

The motion of the reciprocating piston assemblies, each of equal mass, and a symmetrical wabble plate need not produce inertia forces and so the mechanism may be termed "force balanced". That is, there is no rotating out-of-balance force caused by the motion of these members. However, the motion of the above-mentioned members does produce a rotating couple. This couple acts about the axis of tilt of the drive hub which is rotating at engine speed and its magnitude is proportional to the square of the shaft speed of the engine and directly proportional to the stroke. Thus, for a specific engine speed and stroke, this rotating couple is constant in magnitude. This couple needs to be balanced to within acceptable limits of engine casing rigidity and strength and the shock absorbing capability of the mountings.

Whilst the method of balancing for fixed displacement engines is relatively simple, variable displacement engines of the type defined in Australian application No. 68274/81 require unique approaches, not only to substantially balance the engine between the minimum and maximum stroke variations but also to minimise the loads on the linkage system and the axial force on the shaft.

Balancing preferably is achieved by creating a couple rotating with the mainshaft at engine speed and about the axis of tilt of the drive hub, but in the opposite direction about this axis to the direction of action of the couple produced by the pistons and wabble plate motion. This "balancing" couple is achieved by the rotation of the tilted drive hub and by the addition of weights diagonally opposed on each side of the drive hub and balanced so that the centrifugal force created by these rotating weights offset from the centre of the mainshaft is neutralised, and a pure couple is produced tending to reduce the tilt of the drive hub from the plane perpendicular to the mainshaft axis. The drive hub may also be constructed without additional weights, symmetrical and of sufficiently large dimensions so that it alone would produce an opposing couple of sufficient magnitude to counteract the couple produced by the piston and wabble plate. In this way it is possible to almost completely balance the engine over the desired displacement range. However, whilst this method of balancing using a drive hub of sufficient magnitude may be practical if plain thrust or tilting pad thrust bearings are employed as the interface between wabble plate and drive hub, it is impractical in this embodiment of the application No. 68274/81. It has also been found that, although a compromise must be made concerning the balance using the previously described method of attaching weights to the drive hub in that the out-of-balance couple will only be substantially reduced, not balanced completely through the displacement range, the method employed in this embodiment allows weight and space savings over the alternative method. Additionally, diagonally opposed weights may be attached to the mainshaft and output shaft to balance the engine substantially perfectly at any desired stroke position. These external weights do not affect the axial load on the mainshaft or the loads on the linkage system.

When the couple due to the pistons and wabble plate is balanced by either the addition of weights to the drive hub, or the enlargement of the drive hub, the result is a reduction of the tensile loading of the links and a reduction in the magnitude of the axial force in the shaft to practical levels, enabling the practical application of the embodiment shown here.

Ease of manufacture of the piston may also be improved by dividing the piston into two parts, the piston and the piston extension. This also enables worn or damaged pistons to be replaced easily by separating the damaged piston from its respective piston extension. This also enables the piston extension to be manufactured from another type of material, better suited to its function than piston material.

BRIEF DESCRIPTION OF THE DRAWINGS

The invention will now be described by way of example and with reference to the accompanying drawings in which:

FIGS. 3 and 4 are similar to FIG. 2, but under different conditions.

FIG. 5 is a transverse cross-section, on line V—V of FIG. 1, of the variable displacement adjusting mechanism for moving the mainshaft and guiding arm simultaneously.

FIG. 6 is a transverse cross-section, on line VI—VI of FIG. 1, of the engine through the linkage system only.

DETAILED DESCRIPTION OF THE PREFERRED EMBODIMENTS

The engine to which the invention is applied may be conventional. However, it is to be appreciated that the invention may equally be applied to an engine of the wabble plate type encorporating a floating wabble plate, whether it be of fixed stroke or whether it be one in which variable angularity and position of the wabble plate gives rise to variable stroke with or without constant compression ratio.

Figure 1:
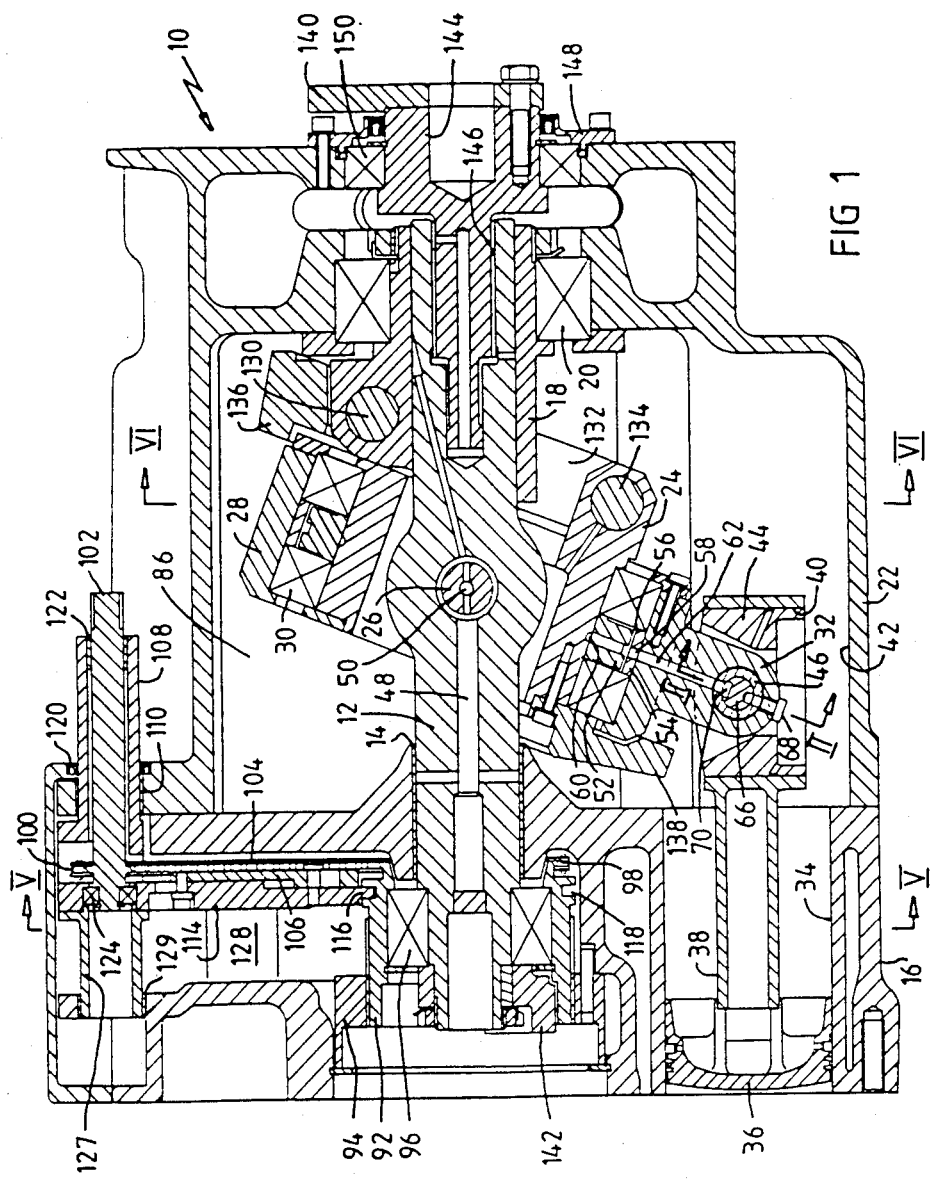
FIG. 1 is a longitudinal cross-section of the engine mechanism illustrating aspects of the invention with the one piston shown in its top dead centre position, and the engine in the maximum displacement position.

FIG. 1 shows details of the engine 10 sufficient to illustrate clearly the application of the invention. In engine 10, a mainshaft 12 is mounted in bearing 14 on a cylinder block 16 and slidably coupled to an anchor sleeve 18. The anchor sleeve 18 is mounted in radial and thrust bearing 20 on the engine case 22. The mainshaft 12 supports a drive hub 24, pivotally mounted on trunnion pin 26. An annular wabble plate 28 is mounted in thrust and radial bearings 30 on the drive hub 24, and includes a plurality of circumferentially spaced arms 32 (in this embodiment five) extending radially therefrom. A plurality of cylinders 34 in cylinder block 16 are arranged around the mainshaft 12, with their axis parallel thereto, and a piston 36 is reciprocally movable in each cylinder 34.

A piston extension 38, connects to the underside of each piston 36. At the end of each extension 38 remote from its piston 36, there is formed a bore 40 having an open end directed radially inwards towards the axis of mainshaft 12. Each piston extension 38 slides in an open sided part cylindrical, "C" shaped bore 42 formed in the engine case 22; each bore 42 being concentric with the respective cylinder 34, but of a diameter to accommodate a connection to a respective arm 32. Each bore 40 slidably receives a crosshead 44 to which an arm 32 is coupled by means of a bearing on a gudgeon pin 46. As the mainshaft 12 (and drive hub 24) rotate, each arm 32 will describe a lemniscate (a figure of eight on the surface of a sphere), and this movement is accommodated by the radial freedom afforded by the crosshead 44 in bore 40, and the tangential freedom afforded by the designed end float on gudgeon pin 46.

The mainshaft 12 has formed in it passages 48 to allow flow of lubricating oil under pressure from the main journal bearing 14. The drive hub 24 is tiltably mounted upon the mainshaft 12 by means of a trunnion pin 26. In operation, oil under pressure passes through passages 50 formed in the trunnion pin 26 to maintain a steady supply of oil to the wabble plate 28 mounted by means of bearings 30 on the drive hub 24. Inner spacer 52 and outer spacer 54 are machined with sufficiently small clearances 56 between them so as to reduce leakage of oil and to ensure sufficient oil supply to the wabble plate arms 32 through ports 58 under all operating conditions. This same clearance 56 ensures a supply of oil mist to the bearings 30 supporting the wabble plate 28 on the drive hub 24, thereby ensuring sufficient lubrication for bearings 30. Oil flow from trunnion pin 26 passes to an annular groove 60 around hub 24, at the radially inner extent of spacer 52.

Figure 2:
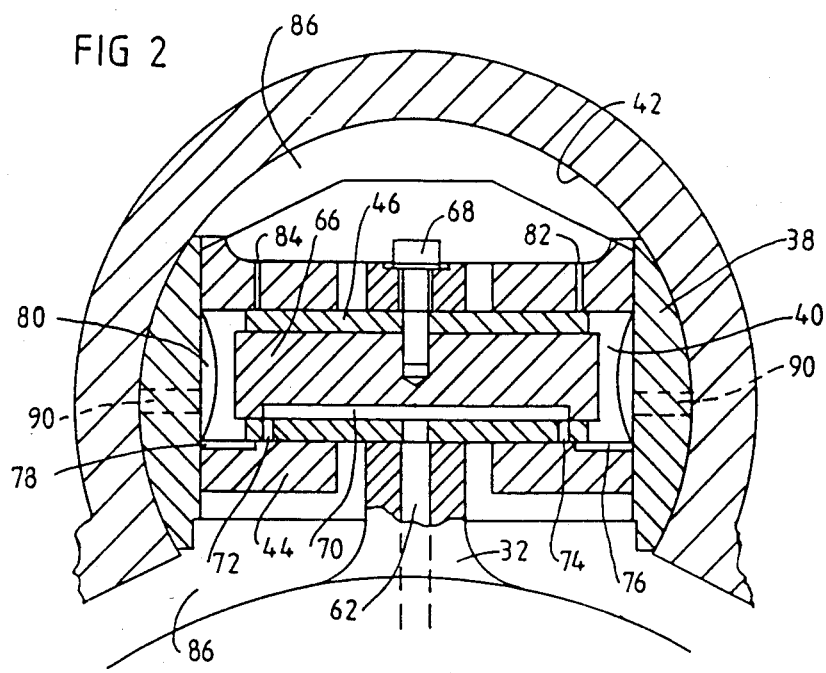
FIG. 2 is a partial sectional view on line II of FIG. 1, showing the damping system.

As can be seen in FIG. 2, the pressurized oil may pass through an oilway 62 formed in each wabble arm 32, and extending from groove 60 through spacer 52, to supply oil to the gudgeon pin 46, and insert 66, which are rigidly attached to each arm 32 by bolt 68. The gudgeon pin 46 translates and rotates in its cross-head bore 40 formed in cross-head 44. Each cross-head 44 is slidably and rotatably mounted in piston extension 38, while extension 38 reciprocates parallel to shaft 12 in bore 42.

Passage 70 in insert 66, and oil holes 72 and 74 in gudgeon pin 46, allow flow of lubricating oil from the wabble arm 32 to cross-head bore 40. The pressurized oil supply ensures adequate lubrication of gudgeon pin 46 as it translates and rotates in its cross-head bore 40 during translation of arm 32, and pin 46 in cross-head 44, under normal operating conditions. That oil supply also provides a supply of oil which is used in damping to control excesses of translation of the wabble arm 32 and pin 46 in the cross-head 44 under abnormal operating conditions. Recesses 76 and 78, formed in each end of the cross-head bore 40, extend only partially into the bore 40 and allow oil to pressurize the cavity 80 created in bore 40 between each end of the gudgeon pin 46 and the piston extension 38, under the aforementioned abnormal operating conditions, by enabling communication between each of outlets 74,72 and a respective cavity 80 under these abnormal conditions. Each recess 76 and 78 extends partially around the circumference of the bore 40 sufficient to allow flow of oil into the cavity under predetermined conditions. Vent holes 82 and 84 formed in the cross-head 44 and extending from the bore 40 and opening into the crankcase 86, allow the inlet of air to each cavity 80 during those normal conditions to provide an air and oil mix, and therefore prevent any possibility of hydraulic lock. The diameters of the oil holes 72 and 74 and vent holes 82 and 84 govern the damping effect of the mechanism. The positioning of the holes 72 and 74 in the gudgeon pin 46, and the positioning of the vent holes 82 and 84, and the depth and extent of the recesses 76 and 78 in the cross-head 44, determine the timing and degree of the hydraulic-pneumatic damping effect. The positions, diameters and extents of the holes 72 and 74, vents 82 and 84, and recesses 76 and 78 can be varied to produce the desired damping effect for a particular engine or pump application.

Figure 3:
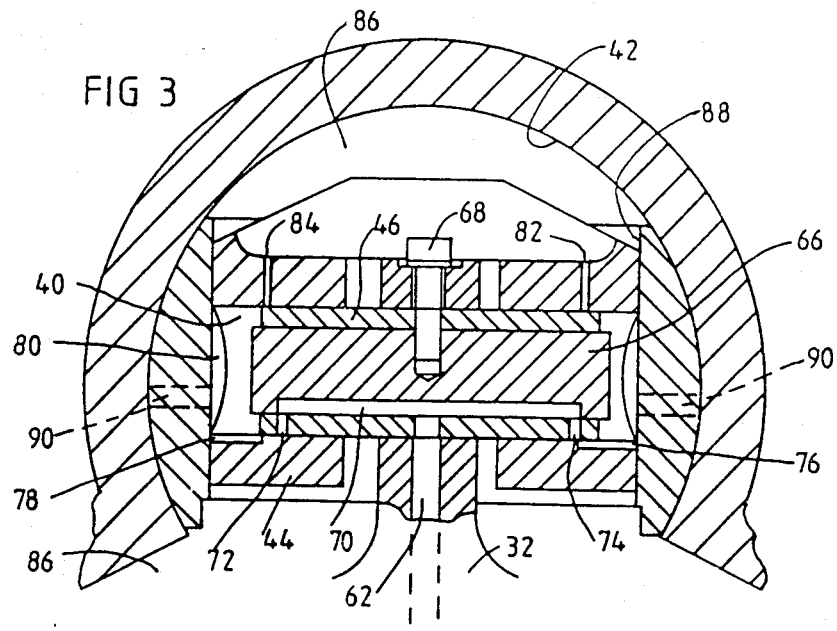

In the operating conditions shown in FIG. 3, the oil hole 72 in the gudgeon pin 46 has not been exposed by the movement of the arm 32 from its central position. The pressure of the air and oil mixture trapped within the cross-head bore 40 has been equalised with the crankcase 86 by the action of the vent holes 82 and 84, admitting or venting depending on the direction of movement of gudgeon pin 46. Therefore it can be seen that, for normal displacements of the wabble plate arm 32 at minimum stroke of the engine, there is negligible damping effect.

FIG. 4 shows the maximum normal displacement of arm 32 from the centre of cross-head 44 in the maximum stroke condition. In the embodiment illustrated, this position corresponds to a condition where gudgeon pin 46 has begun to compress the air and oil mixture trapped in the end of the cross-head bore 40 adjacent hole 72 and recess 76, creating a resisting force to the further displacement of the arm 32. Some dynamic pressure buildup is present due to the restriction of the oil hole 74. This pressure has a secondary function of creating a hydrostatic bearing between the cross-head 44 and the piston extension bore 88. The holes 90 through the piston extension 38 to the bore 42 act as oil supply holes to the sliding surface on the piston extension 38 as it reciprocatess in the cylinder bore 42.

The other end of the cross-head bore 40 is able to receive air through the vent hole 84, equalising pressure differences between the associated cavity 80 and the crankcase 86. During operation at smaller strokes, the off-centre displacement of the arm 32 is less than shown in FIG. 4 and so the damping effect is correspondingly less. At minimum stroke, under normal operating conditions, the oil holes 72 and 74 are not opened with displacement of the arm 32 from its central position in the cross-head 44 and the vent holes 82 and 84 remain open, and so no significant damping occurs. However, when deceleration or other reasons cause the wabble plate arms 32 to attempt movements outside their normal displacements, the damping mechanism operates by displacing the oil and air mixture trapped in the cross-head bore 40, with a corresponding build-up of pressure resisting the movement of the arms 32. In the case of sudden disturbances of the wabble plate, causing a sudden maximum movement of the arm and gudgeon pin, the pressure in the cross-head may exceed the oil supply pressure, causing a reversing of the oil flow back through the arm. This produces a strong restoring force, but the air and oil mixture eliminates any tendency for hydraulic hammer or lock.

The overall arrangement is such that oil seepage from outlets 72,74 ensures a lubricating film of oil tobe maintained around the area of surface contact between gudgeon pin 46 and bore 40 during all operating conditions. Further oil seepage from recesses 76,78 into the respective cavities 80, and through the latter, ensures a lubricating film of oil between cross-head 44 and bore 88. Also, seepage from cavities 80 via holes 90 ensures a lubricating film between extension 38 and bore 42. Such lubricating films enable smooth rotation and translation of gudgeon pin 46 under normal operating conditions, and smooth reciprocation of cross-head 44 in bore 88 and of piston extension 38 in bore 42.

When wabble plate arms 32 are caused to attempt movements outside their normal displacements, vent holes 82,84 preferably close before the respective outlet 74,72 is brought into communication with the respective recess 76,78 and, via the latter, with the respective cavity 80. On closure of a vent hole 82 or 84, a mix of oil and air in the associated cavity 80 initiates the damping effect by compression of the air of that mix. If the extent of abnormal movement of arms 32 is sufficient to bring the respective one of outlets 74,72 into communication with the associated recess 76,78, the damping effect is enhanced by oil flow from passage 70 to the cavity 80, via the respective outlet 74 and recess 76 or outlet 72 and recess 78. On resumption of normal movement of arms 32, to give rise to a lesser translation of gudgeon pin 46 in bore 40, the reverse procedure occurs, with oil flow from passage 70 through outlets 72,74 initially being terminated, and reduction of pressure in cavity 80 by opening of the latter to atmosphere through the respective vent hole 82 or 84.

In summary, it can be seen that the invention provides completely adequate lubrication of the gudgeon pin, cross-head and piston extension, and also provides a damping mechanism which has negligible effect at normal displacements of the wabble plate arms, while also providing effective damping action whenever the displacements of the arms exceed their normal values and thereby prevents noisy and potentially destructive metal-to-metal contact which would occur without damping. A desired damping can be obtained through the positioning of the holes and vents, and with a pressurized supply of engine lubricating oil.

The damping mechanism provided by the invention is more simple, but able to be more effective, than previous damping mechanisms or mechanical stabilizing systems. The invention can eliminate the need for mechanical means for absorbing torque reaction of the wabble plate and also permits the plate to perform its oscillating motion. Advantages of the invention are in its simplicity; no complicated gearing or linkage being necessary for normal operation of the engine or pump. The absence of gearing or linkages reduces noise level and wear.

To vary the displacement of the engine 10, means are provided for shifting the mainshaft 12 axially with respect to the cylinder block 16 and engine case 22 and for simultaneously altering the angle between the drive hub 24 and the mainshaft axis. The latter alteration changes the stroke of the pistons 20 such that their respective top dead centre positions are properly located.

The means for shifting mainshaft 12, by a screw member 92 and nut 94, via thrust bearing 96, is somewhat as described in patent application No. 8274/81. However, in the present invention, rotation of screw member 92 is achieved by a sprocket 98 fixed to screw member 92, operated by another sprocket 100 fixed to a rotary actuator shaft 102, and a chain 104 passing around the two sprockets 98 and 100 to complete the connection therebetween. An adjustable, double sided chain tensioner 106 reduces backlash to a minimum by bearing against one or each run of chain 104.

It will be appreciated that as mainshaft is shifted axially, due to rotation of screw member 92 in nut 94, by rotation of shaft 102 and the action of chain 104, so must the chain sprocket 100 fixed to actuator shaft 102 shift axially to ensure alignment of chain 104 as screw member 92 moves axially. To provide this synchronous movement, a shaft carrier 108 is slidably mounted on bearing 112, and has fixed thereto a radially extending follower arm 114 coupled to the screw member 92 via a tongue 116 located in groove 118 of screw member 92. An axial motion of screw member 92 and thus mainshaft 12 will cause a corresponding motion of sprocket 100, follower arm 114 and actuator shaft 102.

As shown in FIGS. 1 and 5, shaft carrier 108 is of elongate tubular form and has actuator shaft 102 extending therethrough. Shaft carrier 108 and shaft 102 project through case 22 at bearing seal 120 to enable rotation of shaft 102 at the free end of the latter. Also, to facilitate rotation of shaft 102, it extends through bearing 122 within shaft carrier 108 and bearing 124 at the radially outer end of arm 114; bearing 124 restraining shaft 102 against axial movement relative to shaft carrier 108 and mainshaft 12. However, shaft carrier 108 is constrained against movement, other than axially with mainshaft 12, by the sides of follower arm 114 sliding on parallel faces 126 and 128 machined in cylinder block 16. An extension member 127, connected to arm 114, extends co-axially beyond shaft 102 and is slidable in bearing 129 in cylinder block 16 to guide shaft 102 in its axial movement.

As indicated, drive hub 24 is pivotally mounted on mainshaft 12 by trunnion pin 26. For any given axial position of mainshaft 12, the angle between drive hub 24 and the axis of mainshaft 12 is fixed by a pinned linkage between drive hub 24 and anchor sleeve 18 which prevents relative rotation therebetween. Anchor sleeve 18 carries a connection pin 130 to which a two-piece link 132 is pivotally connected at one end. At its other end link 132 is pivotally connected to a pin 134 mounted on drive hub 24. An identical linkage will normally be provided on the opposite side of drive hub 24. When mainshaft 12 is shifted axially, link 132 alters the angle of drive hub 24 and wabble plate 28.

To maintain a substantially linear variation of compression ratio between predetermined limits at minimum and maximum engine displacement, the connection between pins 130 and 134 require preferably to be as long as possible. By the geometry of the linkages as shown in FIGS. 1 and 6, this is achieved by pin 130 being as far as practicable to the side of the axis of mainshaft 12 opposite to pin 134.

The placement of pin 130 at a preferred point above the diametral clearance of mainshaft 12, provides high structural integrity and ease of manufacture, particularly as very high reversing loads are to be controlled by pins 130, 134 and links 132.

Balancing is achieved by attaching diagonally opposed weights 136 and 138, on drive hub 24. Weight 136 may be suitably shaped such as to straddle anchor sleeve 18 and attach to the sides of the drive hub 24 and, in the illustrated arrangement, weight 136 may be U-shaped. Weight 138 may, as shown, also act as retaining means for bearings 30. Additional balance weights 140 and 142 are attached to an output shaft 144 and mainshaft 12 respectively to trim the balance of the engine at a desired stroke position.

Mainshaft 12 and output shaft 144 are coupled by a spline 146 therebetween so to allow for the required axial adjustability for the former. In the arrangement shown, spline 146 is within mainshaft 12 (within sleeve 18); with shaft 144 being axially fixed by retaining ring 148 and rotatable in a bearing 150 on engine case 22. However, instead of shaft 144 being splined to mainshaft 12, shaft 144 may be directly coupled to sleeve 18.

In none of the figures of the drawings is a cylinder head assembly illustrated. This may be of conventional design, depending on the purpose for which the mechanism is to be used, principally on whether it is used as an engine or pump.

Finally, it is to be understood that various alterations, modifications and/or additions may be introduced into the constructions and arrangements of parts previously described without departing from the spirit or ambit of the invention.

We claim:

1. A wabble plate engine mechanism including: a cylinder block having a mainshaft rotatable therein about its longitudinal axis; a drive hub obliquely mounted on the mainshaft for rotation therewith; a wabble plate mounted on the drive hub for rotation on a wabble plate rotational axis inclined with respect to said longitudinal axis; and a plurality of cylinders arranged around the mainshaft, each with a piston reciprocally movable therein along a respective axis substantially parallel to the mainshaft axis of rotation, each piston being coupled to a respective arm of the wabble plate; wherein the coupling between each piston and its arm of the wabble plate comprises a cross-head reciprocable in a bore defined by an extension of the piston, which bore extends radially with respect to the mainshaft axis of rotation, and a gudgeon pin fixed in relation to the arm and reciprocally movable end-wise between opposed ends of a bore defined in the cross-head; the cross-head bore defining at each end thereof, with each end of the gudgeon pin, a respective cavity; each coupling including lubricant access means comprising:

(a) a passage extending longitudinally of the gudgeon pin, said passage under all operating conditions for the engine mechanism communicating intermediate its ends with a oilway through said arm by which lubricant liquid is able to pass to said passage from the mainshaft, through the drive hub and through the wabble plate;

(b) a respective lubricant outlet adjacent each end of the passage, each said outlet being substantially closed by said cross-head bore during end-wise movement of the gudgeon pin under normal operating conditions for said engine mechanism but maintaining lubrication of said gudgeon pin in said cross-head bore, by said lubricant liquid, under all operating conditions for said engine mechanism;

(c) a respective recess at each end of said cross-head bore, at each said cavity, said recesses being substantially isolated from said passage and lubricant liquid therein under said normal operating conditions due to said outlets being substantially closed by said cross-head bore, an alternate one of said recesses providing communication between its cavity and said passage, via a respective said outlet, for flow of lubricant liquid alternatively to each of said cavities during operating conditions for said engine mechanism causing end-wise movement of the gudgeon pin of greater amplitude than for said normal conditions; and (d) air vent means formed in said cross-head an comprising a respective vent hole adjacent each cavity and each providing communication between said cross-head bore and the exterior of said cross-head, the vent holes being positioned such that:
  (i) as the gudgeon pin moves in each direction of its end-wise movement, with said greater amplitude, a quantity of air is caused to be drawn via one vent hole into the one of the cavities defined at the end of the cross-head from which the gudgeon pin is moving; and
  (ii) before communication is established between the other cavity and said passage via the respective said recess, the other vent hole is substantially closed by the gudgeon pin so as to retain in said other cavity a similar such quantity of air previously caused to be drawn therein; the arrangement of said lubricant access means being such that, as the gudgeon pin moves end-wise with said greater amplitude in turn toward each end of the cross-head bore, lubricant liquid is supplied to the respective said cavity and thereby dampens endwise movement of the gudgeon pin, with the quantity of air retained in each cavity in turn preventing hydraulic locking of the gudgeon pin by said lubricant liquid.

2. An engine mechanism according to claim 1, wherein each coupling enables the supply of said liquid in turn to each cavity thereof such as to dampen both the extent and rate of said endwise movement of greater amplitude.

3. An engine mechanism according to claim 1, wherein said gudgeon pin is a cylindrical sleeve closed at each end, the cylindrical sleeve having a bore between said ends which defines said passage.

4. An engine mechanism according to claim 1, wherein lubricant liquid supplied to each coupling from the mainshaft passes through flow-ways enabling the supply of lubricant liquid to bearing means between the drive hub and the wearable plate.

5. An engine meachanism according to claim 1, wherein said gudgeon pin comprises a cylindrical sleeve having an insert rod therein, said passage being defined in one of the inner surface of the sleeve and the other surface of the insert.

6. An engine mechanism according to claim 1, wherein each said recess has a width circumferentially of the cross-head bore which is substantially larger than the corresponding width of the respective outlet such that said communicaiton is achieved despite limited rotation of the gudgeon pin in the cross-head bore simultaneously with said end-wise movement.

7. An engine mechanism according to claim 1 wherein said cross-head bore is open-ended, each said cavity being bounded in part by said piston extension bore.

8. An engine mechanism according to claim 7, wherein each cavity is in communication with an external bearing surface of the piston extension by means of a respective passage through said extension, such that lubricant liquid can pass to said bearing surface under a pumping action provided by the gudgeon pin at least durig end-wise movement of the gudgeon pin of greater amplitude that for normal operating conditions for the engine mechanism.

9. An engine mechanism according to claim 1 including means for shifting the rotational axis of the wabble plate along the axis of rotation of the mainshaft.

10. An engine mechanism according to claim 9, wherein the shifting means includes a drawing member rotatably mounted on the cylinder block and coupled to the mainshaft so that rotation of the drawing member draws the mainshaft axially; the shifting means further including an actuator shaft rotatable on an axis parallel to but spaced laterally of the mainshaft, and a drive train coupled between the actuator shaft and the drawing member.

* * * * *

UNITED STATES PATENT AND TRADEMARK OFFICE
CERTIFICATE OF CORRECTION

PATENT NO. : 4,688,439

DATED : August 25, 1987

INVENTOR(S) : George K. Cureton et al.

It is certified that error appears in the above-identified patent and that said Letters Patent is hereby corrected as shown below: Title page:

In the Abstract, line 7, delete "comprises" and insert --comprise--.

Col. 1, line 17, delete "applications" and insert --application--.

Col. 2, line 57, delete "amplidute" and insert --amplitude--.

Col. 5, line 49, delete "encorporating" and insert --incorporating--.

Col. 7, line 40, delete "reciprocatess" and insert --reciprocates--.

Col. 7, line 66, delete "tobe" and insert --to be--.

Col. 8, line 62, delete "No. 8274/81" and insert --No. 68274/81--.

Col. 11, line 1, delete "an" and insert --and--.

Col. 12, line 2, delete "wearable" and insert --wabble--.

Col. 12, line 3, delete "meachanism" and insert --mechanism--.

Col. 12, line 6, delete "surface" and insert --surfaces--.

Col. 12, line 12, delete "communicaiton" and insert --communication--.

Col. 12, line 25, delete "durig" and insert --during--.

Col. 12, line 26, delete "that" and insert --than--.

Signed and Sealed this

Twenty-ninth Day of November, 1988

Attest:

DONALD J. QUIGG

Attesting Officer

Commissioner of Patents and Trademarks